United States Patent
Byrge

(10) Patent No.: US 12,329,077 B2
(45) Date of Patent: Jun. 17, 2025

(54) AQUAPONICS PLANT PRODUCTION SYSTEM

(71) Applicant: Cori Byrge, Cincinnati, OH (US)

(72) Inventor: Cori Byrge, Cincinnati, OH (US)

(*) Notice: Subject to any disclaimer, the term of this patent is extended or adjusted under 35 U.S.C. 154(b) by 27 days.

(21) Appl. No.: 18/303,206

(22) Filed: Apr. 19, 2023

(65) Prior Publication Data

US 2023/0337609 A1 Oct. 26, 2023

Related U.S. Application Data

(60) Provisional application No. 63/363,351, filed on Apr. 21, 2022.

(51) Int. Cl.
*A01G 31/02* (2006.01)
*A01G 31/06* (2006.01)

(52) U.S. Cl.
CPC ............. *A01G 31/02* (2013.01); *A01G 31/06* (2013.01)

(58) Field of Classification Search
CPC ..... A01G 31/06; A01G 31/00; A01G 2031/00
See application file for complete search history.

(56) References Cited

U.S. PATENT DOCUMENTS 4,669,217 A 6/1987 Fraze
7,553,410 B1 * 6/2009 Chennault ............... C02F 3/327
210/260

(Continued)

FOREIGN PATENT DOCUMENTS

CN 202524909 U 11/2012
CN 105594650 A * 5/2016

(Continued)

OTHER PUBLICATIONS

Darabitabar, F., Yavari, V., Hedayati, A. et al., "Nanocrystalline cellulose based on chitosan hydrogel structure as a biological adsorbent for effluent of fish culture farms". Environ Sci Pollut Res 29, 83770-83782 (2022). https://doi.org/10.1007/s11356-022-21343-2.

(Continued)

*Primary Examiner* — Brady W Frazier
*Assistant Examiner* — Spencer T Callaway
(74) *Attorney, Agent, or Firm* — Renner, Otto, Boisselle & Sklar, LLP

(57) ABSTRACT

An aquaponics plant production system includes a flow-through chamber including one or more removable plant receptacles extending into the flow-through chamber. Each of the one or more removable plant receptacles is configured to contain one or more plant's roots. The aquaponics plant production system also includes a nutrient-supplementing hydroponic substrate contained within at least one of the one or more removable plant receptacles. The nutrient-supplementing hydroponic substrate is configured to supplement the one or more plant's roots with one or more nutrients. The aquaponics plant production system also includes a pre-filter chamber located upstream of the flow-through chamber, a post-filter chamber located downstream of the flow-through chamber, and a pump configured to direct aquarium wastewater from an aquarium into the pre-filter chamber such that the aquarium wastewater is circulated through the pre-filter chamber, the flow-through chamber, the post-filter chamber and back into the aquarium.

18 Claims, 3 Drawing Sheets

(56) References Cited

U.S. PATENT DOCUMENTS

| | | | |
|---|---|---|---|
| 11,197,435 B2 | | 12/2021 | Cademartiri et al. |
| 2006/0112630 A1* | | 6/2006 | Kimes .................... A01G 31/02 |
| | | | 47/62 C |
| 2014/0223818 A1 | | 8/2014 | Coghlan |
| 2014/0263009 A1* | | 9/2014 | von Herbing .......... A01G 31/00 |
| | | | 210/195.1 |
| 2015/0230439 A1* | | 8/2015 | Harwood ............. A01K 63/045 |
| | | | 119/227 |
| 2017/0283333 A1* | | 10/2017 | Rosenthal ................ C05G 3/40 |
| 2017/0318762 A1* | | 11/2017 | Kuo .......................... C02F 9/00 |
| 2019/0343055 A1 | | 11/2019 | Sakakibara et al. |
| 2020/0267914 A1 | | 8/2020 | Shani et al. |
| 2021/0392834 A1* | | 12/2021 | Rouxel .................. A01G 9/023 |

FOREIGN PATENT DOCUMENTS

| | | | | |
|---|---|---|---|---|
| CN | 108203212 | A | 6/2018 | |
| CN | 111437796 | A | 7/2020 | |
| CN | 114145256 | A | 3/2022 | |
| EP | 3305066 | A1 * | 4/2018 | ............ A01G 31/02 |
| EP | 4019609 | A1 | 6/2022 | |
| JP | 2015084684 | A | 5/2015 | |
| KR | 101466801 | B1 | 11/2014 | |
| KR | 102109495 | B1 | 5/2020 | |
| KR | 20220072625 | A | 6/2022 | |
| KR | 20220147735 | A | 11/2022 | |
| RO | 132657 | A2 | 6/2018 | |
| WO | 2016024713 | A1 | 2/2016 | |
| WO | 2018092142 | A1 | 5/2018 | |

OTHER PUBLICATIONS

Dimitri R Kioussis, Fredrick W Wheaton, Peter Kofinas, "Reactive nitrogen and phosphorus removal from aquaculture wastewater effluents using polymer hydrogels" Aquacultural Engineering, vol. 23, Issue 4, 2000, pp. 315-332, ISSN 0144-8609, https://doi.org/10.1016/S0144-8609(00)00058-3.(https://www.sciencedirect.com/science/article/pii/S0144860900000583).

Dawid Skrzypczak et al., "New directions for agricultural wastes valorization as hydrogel biocomposite fertilizers", Journal of Environmental Management, vol. 299, 2021, 113480, ISSN 0301-4797, https://doi.org/10.1016/j.jenvman.2021.113480. (https://www.sciencedirect.com/science/article/pii/S0301479721015425).

M. H. Jayan S. Karunarathna, Kerri M. Bailey, Bethany L. Ash, Paul G. Matson, Hans Wildschutte, Timothy W. Davis, W. Robert Midden, and Alexis D. Ostrowski, "Nutrient Capture from Aqueous Waste and Photocontrolled Fertilizer Delivery to Tomato Plants Using Fe(III)—Polysaccharide Hydrogels", ACS Omega 2020 5 (36), 23009-23020 DOI: 10.1021/acsomega.0c02694.

M. H. Jayan S. Karunarathna, et al., "Reclaiming Phosphate from Waste Solutions with Fe(III)—Polysaccharide Hydrogel Beads for Photo-Controlled-Release Fertilizer", Journal of Agricultural and Food Chemistry 2019 67 (44), 12155-12163, DOI: 10.1021/acs.jafc.9b02860.

Bittsánszky, András & Gyulai, G. & Junge, Ranka & Schmautz, Zala & Komives, Tamas, (Aug. 2015), "Plant protection in ecocycle-based agricultural systems: aquaponics as an example". 10.13140/RG.2.1.4458.0321.

"Aquasprouts Garden", Web Page: https://aquasprouts.com/products/29-gal-aquasprouts-aquaponics-garden?variant=39853249232998&utm_campaign=gs-campaign-2018-06-18&utm_source=google&utm_medium=shopping_usc&gclid=EAlaIQobChMI1dP1mJS2_gIVJBDnCh1RtwSFEAQYAyABEgLz-PD_BwE, (2023).

* cited by examiner

AQUAPONICS PLANT PRODUCTION SYSTEM

This application claims priority of U.S. Application No. 63/363,351, filed Apr. 21, 2022, which is hereby incorporated herein by reference in its entirety.

TECHNICAL FIELD

The present disclosure relates generally to aquaponics, and more particularly to a plant production system for aquaponics.

BACKGROUND

Overapplications of synthetic fertilizers, manure, and pesticides by the industrial soil-based agriculture industry can damage consumer health and environmental integrity. Millions of tons of synthetic and manure fertilizers are added to farmland each year, and this significantly contributes to runoff, nutrient pollution, and eutrophication in nearby waterways. Bacterial contamination of consumables following manure applications can cause serious illness and even death. Furthermore, many pesticides have been proven to be carcinogenic to humans and negatively influence ecological processes.

Therefore, aquaponics has been used as an alternative form of sustainable agriculture to grow plants and fish together in a closed loop system without soil, harmful chemicals, or pesticides. Aquaculture farmers integrate aquaponics within their systems by using plants to reduce the nitrogen concentration of their wastewater so they can recycle the water, conserve resources, and prevent the contamination of local ecosystems. Aquaponics is the combination of aquaculture and hydroponics, using nutrients from fish waste, instead of chemical nutrients, for plant growth, and can be accomplished in an aquarium as small as 10 gallons. However, aquaponic farmers often deal with waste disposal issues because of excess nitrogen generated from the waste from aquaculture organisms and the issue of essential micronutrient nutrient deficiencies, such as iron and calcium, which can limit plant growth and reduce the optimal removal of nitrogen from the wastewater.

Specifically, nitrogen from fish waste is typically not effectively harnessed and recycled in home aquariums or aquaculture systems. Effective use of aquarium nitrogen has the potential to provide numerous benefits, including grocery savings, the reduction of fertilizer costs for plant growers, the improvement in health and wellness of the consumer through independent food production, and reducing the carbon footprint, and food waste. Moreover, iron, for example, is a limiting nutrient in current aquaponic systems and many within the industry agree that it is one of the few additives that should be used. However, most chelated forms of iron on the market are synthetic, and aquaponics users are limited to supplementing their aquariums by spraying such synthetic supplements directly on their plants or by dosing the entire aquarium. The use of synthetic chemicals in their systems does not align with their values and mission statements regarding organic and sustainable best management practices. Therefore, there is a need to develop a strategy that allows home and commercial aquaponic growers to both effectively harness the value of nitrogen from fish waste and provide a more natural and efficient nutrient supplementation for plant growth.

SUMMARY

An aquaponics plant production system utilizing a nutrient supplementing hydroponic substrate is disclosed herein for enabling sustainable growth of nutrient dense plants for home and commercial growers. The nutrient-supplementing hydroponic substrate both serves as a media for plants to grow, as well as supplements the plant roots with essential plant micronutrients. Plant receptacles (e.g., baskets) hold the plant roots and the nutrient-supplementing hydroponic substrate as wastewater from the aquarium is circulated through the system. As circulating aquarium wastewater passes through the plant receptacles, the nutrient-supplementing hydroponic substrate is configured to supplement the plant roots with important micronutrients, like iron, in a bioavailable state directly at the plant root zone. This occurs as the nutrient-supplementing hydroponic substrate degrades via biological iron-acquisition processes, for example iron-chelate reductase. The nutrient-supplementing hydroponic substrate keeps the plant root zone in a low pH condition, increasing the bioavailability of other important nutrients and creating a custom microenvironment for plant roots that does not encounter or harm fish in the aquaponic system. That is, the nutrient-supplementing hydroponic substrate allows a user to raise nutrient levels in the system without dosing the entire tank, as the nutrients are suspended in the nutrient-supplementing hydroponic substrate and do not reach toxic levels in the aquarium.

The aquaponics plant production system therefore helps reduce non-renewable inputs compared to conventional farming (e.g., soil, fertilizer, water), increase local food production, and provide clean consumable products to customers. Access to this aquaponics plant production system allows consumers to improve their sustainable lifestyle by growing personal or local produce with alternative farming technology, feel secure about how their food is grown, and educate themselves on advanced, alternative, and sustainable growing practices. For example, the aquaponics plant production system disclosed herein may be favorable for home or community gardeners in water scarce regions, aquaponic/hydroponic operators that need technology to prevent or mitigate micronutrient deficiencies, or off-the-grid growers.

According to an aspect of the present disclosure, an aquaponics plant production system includes a flow-through chamber including one or more removable plant receptacles extending into the flow-through chamber. Each of the one or more removable plant receptacles is configured to contain one or more plant's roots. The aquaponics plant production system also includes a nutrient-supplementing hydroponic substrate contained within at least one of the one or more removable plant receptacles. The nutrient-supplementing hydroponic substrate is configured to supplement the one or more plant's roots with one or more nutrients. The aquaponics plant production system also includes a pre-filter chamber located upstream of the flow-through chamber, a post-filter chamber located downstream of the flow-through chamber, and a pump configured to direct aquarium wastewater from an aquarium into the pre-filter chamber such that the aquarium wastewater is circulated through the pre-filter chamber, the flow-through chamber, the post-filter chamber and back into the aquarium.

According to an embodiment of any paragraph(s) of this disclosure, the nutrient-supplementing substrate is a soft iron-based hydrogel chelated with natural polymers and is configured to supplement the one or more plant's roots with iron.

According to an embodiment of any paragraph(s) of this disclosure, the pre-filter chamber includes a pre-filter aquarium mount configured to support the pre-filter chamber on a first side top edge of the aquarium, and the post-filter chamber includes a post-filter aquarium mount configured to support the post-filter chamber on a second side top edge of the aquarium opposite the first side top edge, such that the flow-through chamber is configured to extend above and across a top opening of the aquarium from the pre-filter chamber at a first side of the aquarium to the post-filter chamber at a second side of the aquarium opposite the first side.

According to an embodiment of any paragraph(s) of this disclosure, the pre-filter chamber is positioned higher than the post-filter chamber such that the flow-through chamber extends from the pre-filter chamber to the post-filter chamber at a decline.

According to an embodiment of any paragraph(s) of this disclosure, the flow-through chamber includes one or more plant receptacle holes extending through a sidewall of the flow-through chamber through which the one or more removable plant receptacles are suspended to extend into the flow-through chamber.

According to an embodiment of any paragraph(s) of this disclosure, the flow-through chamber includes a dam located between the flow-through chamber and the post-filter chamber, the dam being configured to maintain the circulated aquarium wastewater at a level in a range of 4.00 centimeters to 6.00 centimeters in the flow-through chamber.

According to an embodiment of any paragraph(s) of this disclosure, the aquaponics plant production system also includes an air pump, an air hose connected to the air pump at a first end of the air hose, and an air stone connected to the air hose at a second end of the air hose, the air pump configured to supply the air hose with air for transferring to the air stone in the circulated aquarium wastewater in the flow-through chamber.

According to an embodiment of any paragraph(s) of this disclosure, the pre-filter chamber includes a biofiltration media configured to convert ammonia and nitrite present in the circulated aquarium wastewater into nitrate before the circulated aquarium wastewater enters the flow-through chamber.

According to an embodiment of any paragraph(s) of this disclosure, the biofiltration media includes a plurality of spheres configured to support microbial colonization for converting the ammonia and nitrite present in the circulated aquarium wastewater into nitrate.

According to an embodiment of any paragraph(s) of this disclosure, the post-filter chamber includes a mechanical filtration media configured to capture solids in the circulated aquarium wastewater before the circulated aquarium wastewater reenters the aquarium.

According to an embodiment of any paragraph(s) of this disclosure, the post-filter chamber includes a chemical filtration media configured to neutralize one or more chemicals in the circulated aquarium wastewater before the circulated aquarium wastewater reenters the aquarium.

According to an embodiment of any paragraph(s) of this disclosure, the mechanical filtration media of the post-filter chamber includes a filter pad, and the chemical filtration media of the post-filter chamber includes activated carbon integrated into the filter pad.

According to an embodiment of any paragraph(s) of this disclosure, the post-filter chamber includes a biofiltration media configured to convert ammonia and nitrite present in the circulated aquarium wastewater into nitrate before the circulated aquarium wastewater reenters the aquarium.

According to an embodiment of any paragraph(s) of this disclosure, the biofiltration media in the post-filter includes a plurality of spheres configured to support microbial colonization for converting the ammonia and nitrite present in the circulated aquarium wastewater into nitrate.

According to an embodiment of any paragraph(s) of this disclosure, the pump extends from the pre-filter chamber and is configured to access the aquarium wastewater from a bottom of the aquarium.

According to an embodiment of any paragraph(s) of this disclosure, the post-filter chamber includes an aquarium access hole configured to allow the circulated aquarium wastewater to reenter the aquarium.

According to an embodiment of any paragraph(s) of this disclosure, each of the one or more removable plant receptacles includes a basket and a lid removably disposed the basket. The basket is configured to contain the nutrient-supplementing hydroponic substrate and the one or more plant's roots. The basket has a plurality of basket holes through which the circulated aquarium wastewater can enter the basket to reach the nutrient-supplementing hydroponic substrate and the one or more plant's roots and exit the basket.

According to an embodiment of any paragraph(s) of this disclosure, the lid includes a groove configured to hold a hydroponic plant growth medium from which the one or more plants germinate.

According to an embodiment of any paragraph(s) of this disclosure, the hydroponic plant growth medium includes a hydroponic sponge.

According to an embodiment of any paragraph(s) of this disclosure, the pre-filter chamber, the flow-through chamber, and the post-filter chamber are variably couplable to each other such that the aquaponics plant production system may be modularly assembled and disassembled.

The following description and the annexed drawings set forth in detail certain illustrative embodiments described in this disclosure. These embodiments are indicative, however, of but a few of the various ways in which the principles of this disclosure may be employed. Other objects, advantages and novel features will become apparent from the following detailed description when considered in conjunction with the drawings.

BRIEF DESCRIPTION OF DRAWINGS

The annexed drawings show various aspects of the disclosure.

DETAILED DESCRIPTION

Figure 1:
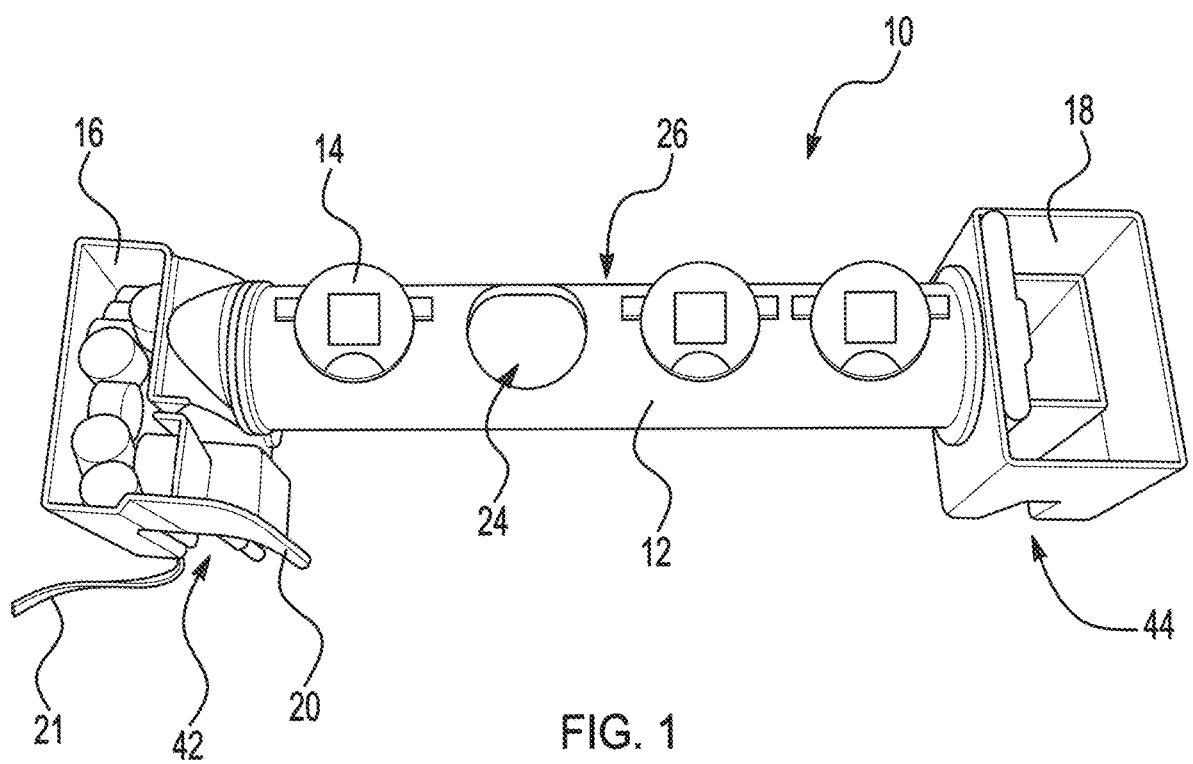
FIG. 1 is a perspective view of an aquaponics plant production system in isolation.
Figure 2:
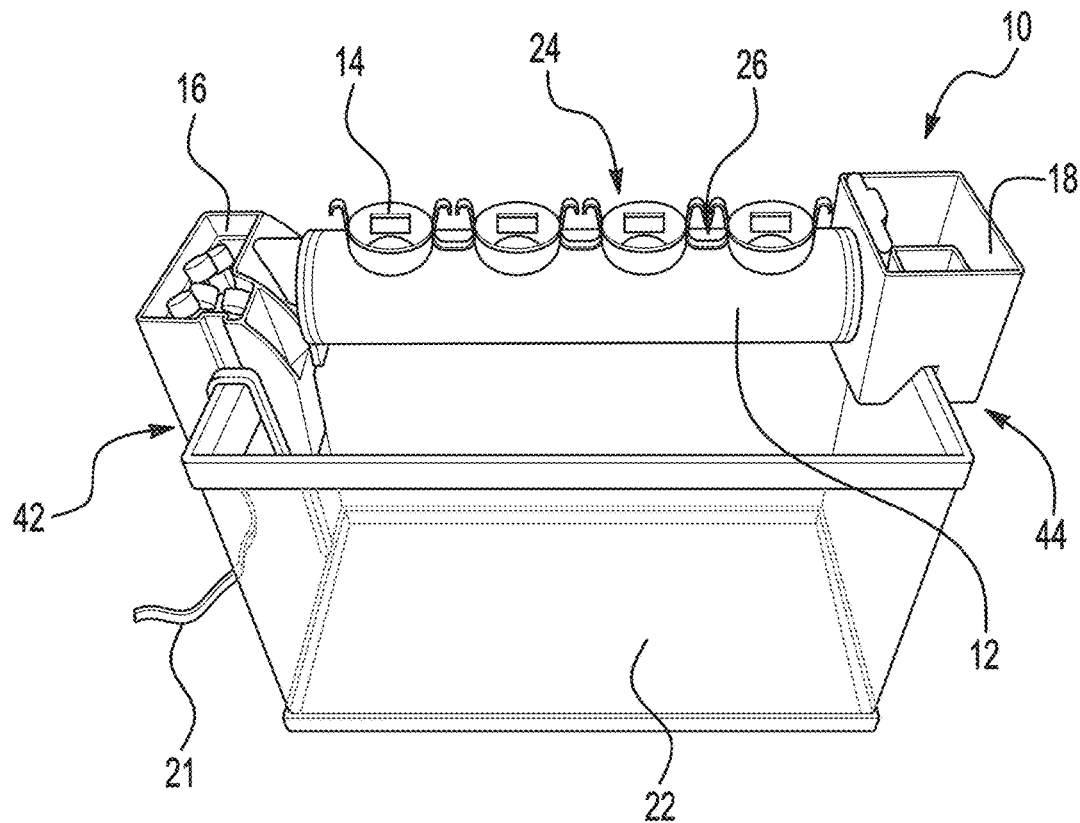
FIG. 2 is a perspective view of an aquaponics plant production system with an aquarium.
Figure 3:
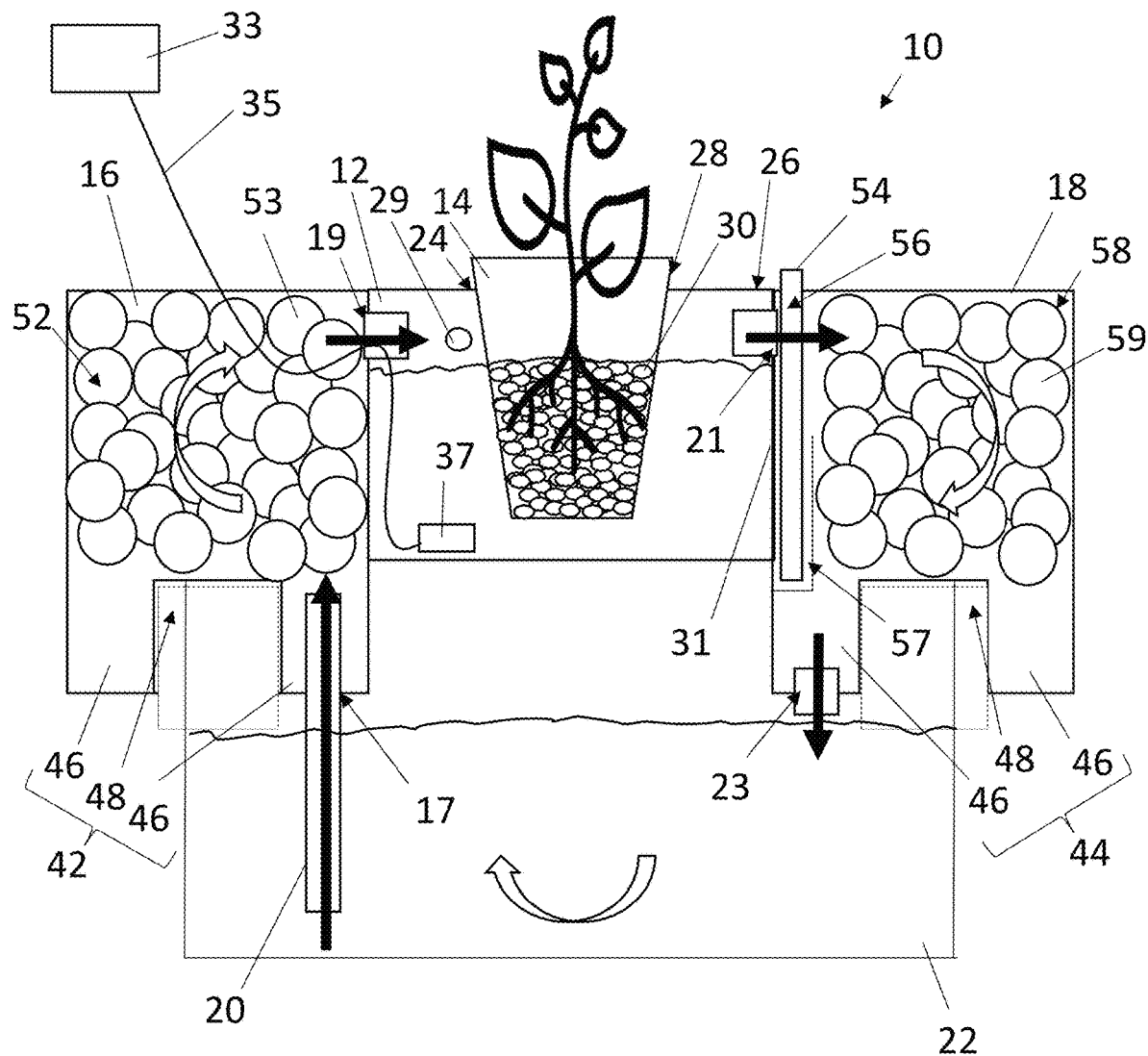
FIG. 3 is a schematic diagram of an aquaponics plant production system.
Figure 4:
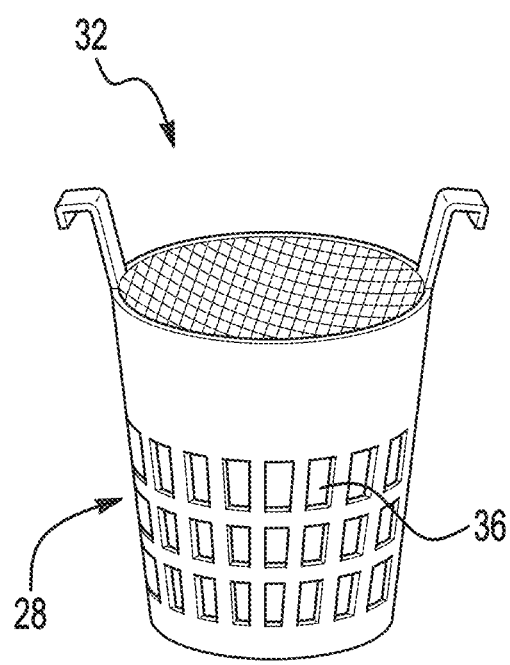
FIG. 4 is a perspective view of a basket of a removable plant receptacle of an aquaponics plant production system.
Figure 5:
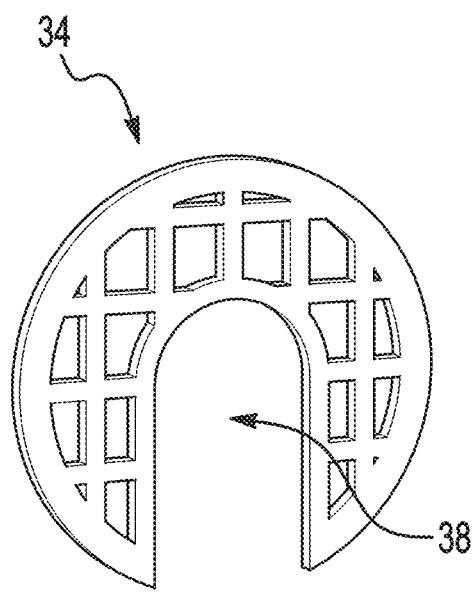
FIG. 5 is a perspective view of a lid of a removable plant receptacle of an aquaponics plant production system.

With initial reference to FIGS. 1-3, an aquaponics plant production system 10 is depicted. FIG. 1 depicts a perspective view of the aquaponics plant production system 10 in isolation, FIG. 2 depicts a perspective view of the aquaponics plant production system 10 with an aquarium 22, and FIG. 3 depicts a schematic diagram of the aquaponics plant production system 10 with an aquarium 22 (components not to scale, but for schematic illustration only). The plant production system 10 includes a flow-through chamber 12 including one or more removable plant receptacles 14 extending into the flow-through chamber 12, a pre-filter chamber 16 located upstream of the flow-through chamber 12, and a post-filter chamber 18 located downstream of the flow-through chamber 12. The plant production system 10 also includes a pump 20 configured to direct aquarium wastewater from an aquarium, such as the aquarium 22 depicted in FIGS. 2 and 3, into the pre-filter chamber 16, such that the aquarium wastewater is circulated in a downstream direction (identified by bold arrows in FIG. 3) through the plant production system 10, that being through the pre-filter chamber 16, to the flow-through chamber 12, then to the post-filter chamber 18 and back into the aquarium 22.

Specifically, the pre-filter chamber 16 includes a pump hole 17 located near a bottom of the pre-filter chamber 16 through which the pump 20 can transfer aquarium wastewater into the pre-filter chamber 16 from the aquarium 22. The pre-filter chamber 16 also includes a flow-through chamber access hole 19 through which the aquarium wastewater can enter the flow-through chamber 12 from the pre-filter chamber 16. The flow-through chamber access hole 19 may be located near a top of the pre-filter chamber 16 where it meets the flow-through chamber 12. The flow-through chamber 12 may include a post-filter chamber access hole 21 through which the aquarium wastewater can enter the post-filter chamber 18 from the flow-through chamber 12. The post-filter chamber access hole 21 may be located near a top of the flow-through chamber 12 where the flow-through chamber 12 meets the post-filter chamber 18. The post-filter chamber access hole 21 may be located, specifically, above a dam 31 that is disposed between a downstream end of the flow-through chamber 12 and the post-filter chamber 18. The dam 31 is configured to maintain the circulated aquarium wastewater at a level in a range of 4.00 centimeters to 6.00 centimeters, for example, 5.08 centimeters, in the flow-through chamber 12. That is, as the circulated aquarium wastewater flows downstream through the aquaponics plant production system 10, the circulated aquarium wastewater fills the flow-through chamber 12 to a level in a range of 4.00 centimeters to 6.00 centimeters, for example 5.08 centimeters, and then flows over the dam 31 through the post-filter chamber access hole 21 into the post-filter chamber 18.

The flow-through chamber 12 may also include an overflow hole 29 extending through a sidewall 26 of the flow-through chamber 12 in a range of 0.25 centimeters to 0.50 centimeters above the water level in the flow-through chamber 12. The overflow hole 29 may be located at any point along the length of the flow-through chamber 12 and is configured to prevent the circulated aquarium wastewater from backflowing into the pre-filter chamber 16 or filling the flow-through chamber 12 above the range of 4.00 centimeters to 6.00 centimeters. Finally, the post-filter chamber 18 may include an aquarium access hole 23 through which the aquarium wastewater can reenter the aquarium 22 from the post-filter chamber 18. The aquarium access hole 23 may be located near a bottom of the post-filter chamber 18.

The pump 20 extends from the pre-filter chamber 16 and is configured to access the aquarium wastewater from near a bottom of the aquarium 10, as depicted in FIGS. 2 and 3. In this manner, aquarium wastewater is moved from the bottom of the aquarium 22, facilitating mixing of the water in the aquarium 22. The pump 20 may be, for example, an impeller pump, and may be powered with electricity via a power cord 27 electrically connected to the pump 20.

The aquaponics plant production system 10 may also include an air pump 33 having an air hose 35 connected to the air pump 33 at a first end and extending into the pre-filter chamber 16 and through the flow-through chamber access hole 19 into the flow-through chamber 12. An air stone 37 may be connected to a second end of the air hose 35. The pump 33 is configured to supply air into the air hose 35 for transferring to the circulated aquarium wastewater in the flow-through chamber 12 through the air stone 37. The air hose 35 may, for example, include a valve to control the amount of air supplied by the pump 33. The air stone 37 may be a porous stone that allows the air supplied by the pump 33 and through the air hose 35 to diffuse into microbubbles as it enters the circulated aquarium wastewater in the flow-through chamber 12 for maintaining oxygenated water at the root zones of the plants. The air stone 37 may have a cylindrical shape with a diameter of 1.0 centimeter and a length of 2.0 centimeters, however the length may be as long as a length of the flow-through chamber 12.

The flow-through chamber 12 includes one or more plant receptacle holes 24 extending through the sidewall 26 of the flow-through chamber 12, through which the one or more removable plant receptacles 14 are suspended to extend into the flow-through chamber 12. For example, as depicted in FIGS. 1 and 2, the flow-through chamber 12 may have four removable plant receptacles 14 each suspended by one of four plant receptacle holes 24 in the flow-through chamber 12. FIG. 3 depicts only one plant receptacle hole 24 and associated removable plant receptacle 14 for illustrative purposes, however, it will be understood that any number of plant receptacle holes 24 and respective removable plant receptacles 14 may be provided in the flow-through chamber 12, depending on the size of the plant production system 10 and the length of the flow-through chamber 12. The one or more removable plant receptacles 14 are suspended by the respective one or more plant receptacle holes 24 via an interference fit, as a sidewall 28 of each of the one or more removable plant receptacles 14 abuts and rests on a periphery of the one or more plant receptacle holes 24. As best depicted in FIG. 3, the sidewall 28 of the one or more removable plant receptacles 14 may be tapered such that the one or more removable plant receptacles 14 extends into the flow-through chamber 12 through the one or more plant receptacle holes 24 as it is suspended by the one or more plant receptacle holes 24.

As seen in FIG. 3, the one or more removable plant receptacles 14 are configured to contain one or more plant's roots, such that one or more plants may grow from the one or more removable plant receptacles 14, as depicted in FIG. 3. A nutrient-supplementing hydroponic substrate 30 is contained within at least one of the one or more removable plant receptacles 14. The nutrient-supplementing hydroponic substrate 30 is configured to directly supplement the one or more plant's roots with one or more additional nutrients, and/or facilitate the uptake of one or more additional nutrients ordinarily deficient in aquarium wastewater. For example, the nutrient-supplementing hydroponic substrate 30 may be an iron-based material chelated with natural polymers, which is configured to directly supplement the one or more plant's roots with iron. The iron-based material may be, for example, a hydrogel prepared in accordance with those described in U.S. Pat. Nos. 10,517,997, 10,080, 715, and U.S. patent application Ser. No. 17/287,817, which are each incorporated herein by reference in their entirety.

The one or more plant receptacles 14 may contain a range of 5 milliliters to 10 milliliters of the iron-based material, and may be re-filled every 2-4 weeks, as the iron-based material degrades via iron-acquisition processes, for example iron-chelate reductase.

Additionally or alternatively, the nutrient-supplementing hydroponic substrate 30 may be another type of hydrogel or other hydroponic substrate configured to directly supplement the one or more plant's roots with another essential nutrient, such as nitrogen, magnesium, calcium, copper and/or zinc. It will be understood that although the soft iron-based hydrogel configured to supplement iron is provided as a non-limiting example, other variations of nutrient-supplementing hydroponic substrates may be used to facilitate the uptake of one or more nutrients. For example the nutrient-supplementing hydroponic substrate 30 may be in the form of a material seeded with symbiotic bacteria that facilitate nutrient uptake by the plant roots, such as expanded clay spheres, perlite, and/or gravel.

Figure 6:
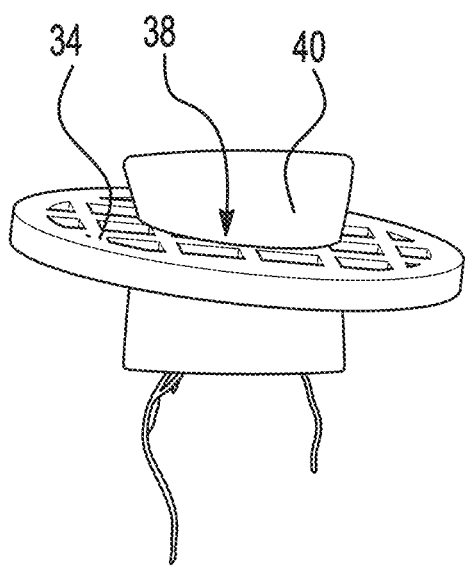
FIG. 6 is another perspective view of a lid of a removable plant receptacle of an aquaponics plant production system.
Figure 7:
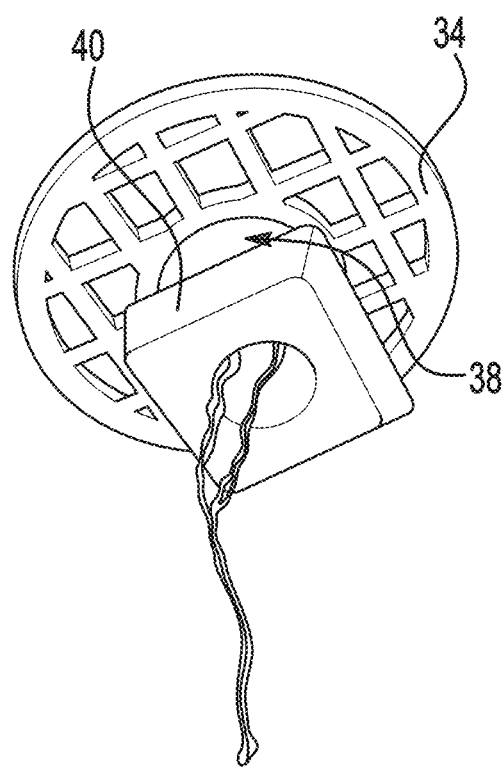
FIG. 7 is another perspective view of a lid of a removable plant receptacle of an aquaponics plant production system.

Turning briefly to FIGS. 4-7, each of the one or more removable plant receptacles 14 includes a basket 32 and a lid 34 removably disposed on the basket 32. The basket 32 is configured to contain the nutrient-supplementing hydroponic substrate 30 and the one or more plant's roots. The basket 30 has a plurality of basket holes 36 extending through the sidewall 28 of the removable plant receptacle 14 (specifically the sidewall 28 of the basket 32), through which the circulated aquarium wastewater can enter the basket 32 to reach the nutrient-supplementing hydroponic substrate 30 and the one or more plant's roots, then exit the basket 32. The lid 34 may include a groove 38 configured to hold a hydroponic plant growth medium 40 from which the one or more plants can germinate. For example, the hydroponic plant growth medium 40 may be a hydroponic sponge, as depicted in FIGS. 6 and 7. The hydroponic plant growth medium 40 can therefore support plant growth after germination and during early growth until the plant's roots reach the nutrient-supplementing hydroponic substrate 30 in the basket 32 of the one or more removable plant receptacles 14, after which the plant may be supported by the nutrient-supplementing hydroponic substrate 30 and the hydroponic plant growth medium 40 may be removed. At this time, the groove 38 of the lid 34 is configured to partially surround a stem of the plant to provide additional support to the plant growth above the lid 34. The groove 38 is open at a peripheral end of the lid 34 and therefore allows the lid 34 to be easily removed from the basket 32 without disturbing the plant stem, as the groove 38 does not completely surround the stem of the plant. For example, a user may wish to remove the lid 34 from the basket 32 to refill the basket 32 with more nutrient-supplementing hydroponic substrate 30 during the plant's growth. Otherwise, when the lid 34 is disposed on the basket 32, the lid 34 serves to shield the plant roots and the nutrient-supplementing hydroponic substrate 30 within the basket 32, which may be photoactive, from light.

Turning back to FIGS. 1-3, the pre-filter chamber 16 includes a pre-filter aquarium mount 42 configured to support the pre-filter chamber 16 on a first side top edge of the aquarium 22, and the post-filter chamber 18 includes a post-filter aquarium mount 44 configured to support the post-filter chamber 18 on a second side top edge of the aquarium 22 opposite the first side top edge. In such manner, when both the pre-filter chamber 16 is supported on the first side top edge of the aquarium 22 by the pre-filter aquarium mount 42, and the post-filter chamber 18 is supported on the second side top edge of the aquarium 22 by the post-filter aquarium mount 44, the flow-through chamber 12 is configured to extend above and across a top opening of the aquarium 22 from the pre-filter chamber 16 at a first side of the aquarium 22 to the post-filter chamber 18 at a second side of the aquarium 22 opposite the first side. The pre-filter aquarium mount 42 and the post-filter aquarium mount 44 may each be formed by two protrusions 46 extending from the pre-filter chamber 16 and the post-filter chamber 18, respectively, with a notch 48 formed therebetween for receiving the first side top edge and the second side top edge, respectively, of the aquarium 22, such that the pre-filter chamber 16 and the post-filter chamber 18 securely rest on the first side top edge and the second side top edge. The pre-filter chamber 16 may be positioned higher than the post-filter chamber 18 such that the flow-through chamber 12 extends from the pre-filter chamber 16 to the post-filter chamber 18 at a decline. For example, the pre-filter aquarium mount 42 may be configured to support the pre-filter chamber 16 higher relative to the first top side edge of the aquarium 22 than the post-filter aquarium mount 44 is configured to support the post-filter chamber 18 relative to the second top side edge of the aquarium 22. In this manner, the aquarium wastewater is circulated in the downstream direction (i.e., from the pre-filter chamber 16 to the flow-through chamber 12, then to the post-filter chamber 18), without the risk of backflow through the aquaponics plant production system 10.

The pre-filter chamber 16 may include a settleable solids basin configured to capture solids in the circulated aquarium wastewater before the circulated aquarium wastewater enters the flow-through chamber 12. The pre-filter chamber 16 may also include a biofiltration media 52 configured to perform biofiltration and convert ammonia and nitrite present in the circulated aquarium wastewater into nitrate, the most tolerable form of nitrogen for fish, before the circulated aquarium wastewater enters the flow-through chamber 12. The biofiltration media 52 may include, for example, a plurality of spheres 53 having a high surface area that are configured to support microbial colonization for converting the ammonia and nitrite present in the circulated aquarium wastewater into nitrate.

The post-filter chamber 18 may include a mechanical filtration media 54 configured to capture solids in the circulated aquarium wastewater before the circulated aquarium wastewater reenters the aquarium 22. The post-filter chamber 18 may also include a chemical filtration media 56 configured to neutralize one or more chemicals, such as natural chemicals that are byproducts of metabolic processes, in the circulated aquarium wastewater before the circulated aquarium wastewater reenters the aquarium 22. For example, the mechanical filtration media 54 of the post-filter chamber 18 may be a filter pad and the chemical filtration media 56 of the post-filter chamber 18 may be activated carbon integrated into the filter pad. The post-filter chamber 18 may include a mechanical filtration media receptacle or notch 57 for holding the mechanical filtration media in place between the flow-through chamber 12 and the post-filter chamber 18. The mechanical filtration media receptacle or notch 57 may be, for example, formed on an inner wall of the post-filter chamber 18. Additionally or alternatively, the flow-through chamber 12 may also include a mechanical filtration media, similar to the mechanical filtration media 54 of the post-filter chamber 18, at a downstream end of the flow-through chamber 12. The post-filter chamber 18 may also include a biofiltration media 58, similar to the biofiltration media 52 of the pre-filter chamber 16, configured to perform further biofiltration and convert ammonia and nitrite present in the circulated aquarium wastewater into nitrate, the most tolerable form of nitrogen for fish, before the circulated aquarium wastewater renters the aquarium 22. For example, the biofiltration media 58 of the post-filter chamber 18 may also include a plurality of spheres 59 configured to support microbial colonization for converting the ammonia and nitrite present in the circulated aquarium wastewater into nitrate.

The aquaponics plant production system 10 is a modular system and is easily assembled and disassembled for customizability. Specifically, each of the pre-filter chamber 16, the flow-through chamber 12 and the post-filter chamber 18 are configured to be variably couplable with each other. For example, the pre-filter chamber 16, the flow-through chamber 12 and the post-filter chamber 18 may each include a screw coupling or interference fit coupling, respectively, for modularly coupling with each other. In this manner, a user can easily assemble the aquaponics plant production system 10 to be of whatever size or length is appropriate for any given aquarium, for example, by assembling two or more flow-through chambers 12 together in sequence. That is, the aquaponics plant production system 10 may be variably configured to fit with any standard size aquarium.

The aquaponics plant production system described herein therefore effectively utilizes nitrogen by recycling water and nutrients for plant growth, enabling users to grow a diverse variety of herbs, fruits and vegetables, among other plants. Not only does the aquaponics plant production system help users save money on grocery bills, but also helps users reduce their carbon footprint. On a bigger scale, use of the aquaponics plant production system may help protect against factors like climate change and disruptions in supply chains that might impact food security. Additionally, use of the nutrient-supplementing hydroponic substrate, for example, the iron-supplementing hydroponic substrate, replaces the conventional form of supplementing nutrients (e.g., chelated iron and/or synthetic fertilizers), as the nutrient-supplementing hydroponic substrate holds several essential nutrients required for the plant directly at the root zone, far from the fish, which balances the needs of the plant with the sensitivities of the fish. The nutrient-supplementing hydroponic substrate therefore serves a dual purpose, as both a plant substrate and a nutrient supplementation. The aquaponics plant production system described herein is applicable and scalable to both home aquarists and commercial growers due to its modular design and ability to fit a variety of aquarium system sizes.

Although the above disclosure has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments. In addition, while a particular feature may have been described above with respect to only one or more of several illustrated embodiments, such feature may be combined with one or more other features of the other embodiments, as may be desired and advantageous for any given or particular application.

What is claimed is:

1. An aquaponics plant production system, comprising:
   a flow-through chamber including one or more removable plant receptacles extending into the flow-through chamber, each of the one or more removable plant receptacles configured to contain one or more plant's roots;
   a nutrient-supplementing hydroponic substrate contained within at least one of the one or more removable plant receptacles, the nutrient-supplementing hydroponic substrate configured to supplement the one or more plant's roots with one or more nutrients;
   a pre-filter chamber located upstream of the flow-through chamber;
   a post-filter chamber located downstream of the flow-through chamber; and
   a pump configured to direct aquarium wastewater from an aquarium into the pre-filter chamber such that the aquarium wastewater is circulated through the pre-filter chamber, the flow-through chamber, the post-filter chamber and back into the aquarium;
   wherein the post-filter chamber includes:
      a chemical filtration media configured to neutralize one or more chemicals in the circulated aquarium wastewater before the circulated aquarium wastewater reenters the aquarium; and
      a biofiltration media configured to convert ammonia and nitrite present in the circulated aquarium wastewater into nitrate before the circulated aquarium wastewater renters the aquarium.

2. The aquaponics plant production system according to claim 1, wherein the nutrient-supplementing hydroponic substrate is an iron-based material chelated with natural polymers and is configured to supplement the one or more plant's roots with iron.

3. The aquaponics plant production system according claim 1, wherein the pre-filter chamber includes a pre-filter aquarium mount configured to support the pre-filter chamber on a first side top edge of the aquarium, and the post-filter chamber includes a post-filter aquarium mount configured to support the post-filter chamber on a second side top edge of the aquarium opposite the first side top edge, such that the flow-through chamber is configured to extend above and across a top opening of the aquarium from the pre-filter chamber at a first side of the aquarium to the post-filter chamber at a second side of the aquarium opposite the first side.

4. The aquaponics plant production system according to claim 1, wherein the pre-filter chamber is positioned higher than the post-filter chamber such that the flow-through chamber extends from the pre-filter chamber to the post-filter chamber at a decline.

5. The aquaponics plant production system according to claim 1, wherein the flow-through chamber includes one or more plant receptacle holes extending through a sidewall of the flow-through chamber through which the one or more removable plant receptacles are suspended to extend into the flow-through chamber.

6. The aquaponics plant production system according to claim 1, wherein the flow-through chamber includes a dam located between the flow-through chamber and the post-filter chamber, the dam being configured to maintain the circulated aquarium wastewater at a level in a range of 4.00 centimeters to 6.00 centimeters in the flow-through chamber.

7. The aquaponics plant production system according to claim 1, further comprising an air pump, an air hose connected to the air pump at a first end of the air hose, and an air stone connected to the air hose at a second end of the air hose, the air pump configured to supply the air hose with air for transferring to the air stone in the circulated aquarium wastewater in the flow-through chamber.

8. The aquaponics plant production system according to claim 1, wherein the pre-filter chamber includes a biofiltration media configured to convert ammonia and nitrite present in the circulated aquarium wastewater into nitrate before the circulated aquarium wastewater enters the flow-through chamber.

9. The aquaponics plant production system according to claim 8, wherein the biofiltration media includes a plurality of spheres with high surface area configured to support microbial colonization for converting the ammonia and nitrite present in the circulated aquarium wastewater into nitrate.

10. The aquaponics plant production system according to claim 1, wherein the post-filter chamber includes a mechanical filtration media configured to capture solids in the circulated aquarium wastewater before the circulated aquarium wastewater reenters the aquarium.

11. The aquaponics plant production system according to claim 1, wherein the post-filter chamber also includes a mechanical filtration media, the mechanical filtration media of the post-filter chamber including a filter pad, and the chemical filtration media of the post-filter chamber including activated carbon integrated into the filter pad.

12. The aquaponics plant production system according to claim 1, wherein the biofiltration media in the post-filter includes a plurality of spheres with high surface area configured to support microbial colonization for converting the ammonia and nitrite present in the circulated aquarium wastewater into nitrate.

13. The aquaponics plant production system according to claim 1, wherein the pump extends from the pre-filter chamber and is configured to access the aquarium wastewater from a bottom of the aquarium.

14. The aquaponics plant production system according to claim 1, wherein the post-filter chamber includes an aquarium access hole configured to allow the circulated aquarium wastewater to reenter the aquarium.

15. The aquaponics plant production system according to claim 1, wherein each of the one or more removable plant receptacles includes a basket and a lid removably disposed in the basket, the basket being configured to contain the nutrient-supplementing hydroponic substrate and the one or more plant's roots, the basket having a plurality of basket holes through which the circulated aquarium wastewater can enter the basket to reach the nutrient-supplementing hydroponic substrate and the one or more plant's roots and exit the basket.

16. The aquaponics plant production system according to claim 15, wherein the lid includes a groove configured to hold a hydroponic plant growth medium from which the one or more plants germinate.

17. The aquaponics plant production system according to claim 16, wherein the hydroponic plant growth medium includes a hydroponic sponge.

18. The aquaponics plant production system according to claim 1, wherein the pre-filter chamber, the flow-through chamber, and the post-filter chamber are variably couplable to each other such that the aquaponics plant production system may be modularly assembled and disassembled.

* * * * *